UNITED STATES PATENT OFFICE.

PETER CAMPBELL AND FRED. A. NEIDER, OF AUGUSTA, KY., ASSIGNORS TO THEMSELVES AND JOHN A. HOPKINS, OF SAME PLACE.

FIFTH-WHEEL FOR VEHICLES.

SPECIFICATION forming part of Letters Patent No. 238,345, dated March 1, 1881.

Application filed October 18, 1880. (No model.)

*To all whom it may concern:*

Be it known that we, PETER CAMPBELL, a subject of the Queen of Great Britain, and FRED. A. NEIDER, a citizen of the United States, both residents of Augusta, in the county of Bracken and State of Kentucky, have jointly invented certain new and useful Improvements in Fifth-Wheels for Vehicles, of which the following is a specification.

Our invention relates to the swiveled connection between the axle and bolster of a vehicle, commonly known as the "fifth-wheel," and has for its objects to give the axle, when turned to either side, a tendency to return to its normal position, to render the operation of the fifth-wheel frictionless and noiseless, and to provide for taking up a portion of the jar and uneven motion of the axle instead of communicating it to the bolster.

To these ends it consists in interposing between the axle and the bolster a torsional spring or cushion, with its upper and lower portions fixed, respectively, to the bolster and axle, so that the turning of the axle twists the spring, and the latter, by torsion, tends to bring the axle back to its normal position.

It further consists in other and subordinate features of construction, all as will be fully hereinafter set forth.

In the accompanying drawings the first six figures illustrate a fifth-wheel constructed in accordance with our invention in its preferred form, and the remaining figures show a modification. Figure 1 is a vertical transverse mid-section taken in the plane of the line $x\ x$. Fig. 2 is a front elevation, which, with all the remaining figures, is on a smaller scale. Fig. 3 is a plan of the axle-plate detached. Fig. 4 is an inverted plan of the bolster-plate detached. Fig. 5 is a sectional perspective of the torsional cushion detached. Fig. 6 is an ideal section of the plates and cushion, taken in the plane of the line $y\ y$ in Figs. 1, 3, and 4, the section being taken in a horizontally-curved plane, but drawn as though taken in a straight plane. Fig. 7 is a front elevation of a modified construction of fifth-wheel, and Fig. 8 is a vertical transverse mid-section of Fig. 7.

Referring to the drawings, A and B are plates attached, respectively, to the bolster or head-block D and to the axle E of a vehicle. F is the reach or perch, which extends back to the rear axle, in the usual manner, and G is the king-bolt. The plate A is secured to the bolster by straps or bolts $c\ c$, and the plate B is secured to the axle by bolts or screws $d\ d$, or other suitable fastenings.

C is a torsional cushion or spring, of yielding and elastic material, which is interposed between the plates A and B, and through which the weight of the bolster and its superincumbent parts is transmitted to the axle. This spring is of such elasticity that as the axle turns to one side or the other of its normal position the spring twists or becomes distorted, taking up the entire normal movement of the axle within its own substance, and without slipping or sliding at its contact with either of the plates A or B. In order to prevent this slipping, its opposite portions or surfaces must be fixed to or engaged by, or caused to adhere to, the surfaces of the plates. In some cases, as when a cushion of yielding and frictional material—such as rubber—is employed, and when the motion of the axle is not great, the friction between the contacting surfaces of the rubber and plates may suffice to prevent slipping; but ordinarily we prefer to provide the plate and cushion with interlocking projections and depressions, as shown in Figs. 3, 5, and 6, where $a\ a$ are lugs or projections on the plates, and $b\ b$ are coinciding recesses or depressions on the cushion.

It is well known that in drawing a vehicle of the ordinary construction across a rough road or pavement the uneven motion of the front wheels causes the axle to play to each side of its normal position, giving the vehicle an uneasy motion, and causing the thills or poles to vibrate back and forth against the horse or between the horses, much to the annoyance of both team and rider. In the ordinary fifth-wheel, also, the axle and bolster come into substantially direct contact with each other, so that nearly all jar, vibration, and uneven motion of the axle is communicated to the bolster, and much of it is conveyed thence through the springs to the body of the vehicle. By the interposition of the torsional forward axle, bearing the forward wheels, swiveled to the bolster, and attached to and capable of turning with the shaft or thills, with the bolster, the king-bolt, or equivalent centering-guide, and with an elastic spring or cushion interposed between the axle and bolster, bearing the weight of the bolster or superincumbent parts, arranged to be twisted by the turning of the axle, having sufficient torsional elasticity to take up by its twisting the entire oscillation or deflection of the axle, and with suitable means for preventing it from slipping or sliding at its connection with either the bolster or the axle, substantially as and for the purposes set forth.

2. A fifth-wheel for a vehicle, consisting of the combination of a plate, A, fixed to the bolster, a plate, B, fixed to the axle, a king-bolt, G, or equivalent centering-guide, an elastic spring or cushion, C, interposed between and engaged by said plates, arranged to be twisted by the turning of the axle, and having sufficient torsional elasticity to take up by its own twisting the entire normal oscillation of the axle, and suitable means for limiting the expansion of said spring, substantially as and for the purposes set forth.

3. The combination, in a vehicle, of the bolster D, the plate A, fixed thereto, the axle E, the plate B, fixed thereto, the yielding cushion or spring C, interposed between the two plates, and adapted to take up by its own distortion the normal oscillating movement of the plate B, without sliding at its contact with either plate, the king-bolt G, or equivalent centering-guide, and the reach F, fixed to the plate A, and extending beneath the axle, and receiving and steadying the king-bolt, substantially as set forth.

4. The combination, in a vehicle, of the bolster D, the plate A, the spring or cushion C, the plate B, the axle E, the cushion i, and the reach F, the latter being fixed relatively to the bolster, substantially as set forth.

5. A fifth-wheel for a vehicle, consisting of the combination of the plates A and B, the interposed torsional cushion C, of rubber or similar yielding substance, the projections a a on said plates, and coinciding depressions b b on said cushion, and the king-bolt G, or equivalent centering-guide, substantially as set forth.

6. A fifth-wheel for a vehicle, consisting of the combination of the annularly-cup-shaped plates A and B, arranged with their edges approaching each other, the annular torsional cushion C, of rubber or similar elastic substance, of elliptical cross-section, and the king-bolt G, or equivalent centering-guide, substantially as set forth.

7. The combination, in a vehicle, of the bolster D, the axle E, the king-bolt G, the reach F, the stays H H, rigidly connecting the reach to the bolster, and the torsional spring or cushion C, interposed between the axle and the bolster, bearing the weight of the bolster and superincumbent parts, and arranged to be twisted by the turning of the axle, substantially as set forth.

8. A fifth-wheel for a vehicle, consisting of the combination of the plates A and B, the boss f, and recess g, formed thereon, the interposed torsional spring or cushion C, and suitable means for limiting the expansion of said spring, substantially as set forth.

In witness whereof we have hereunto signed our names in the presence of two subscribing witnesses.

PETER CAMPBELL.
FRED. A. NEIDER.

Witnesses:
GEO. W. JONES,
JOHN M. HARBESON.

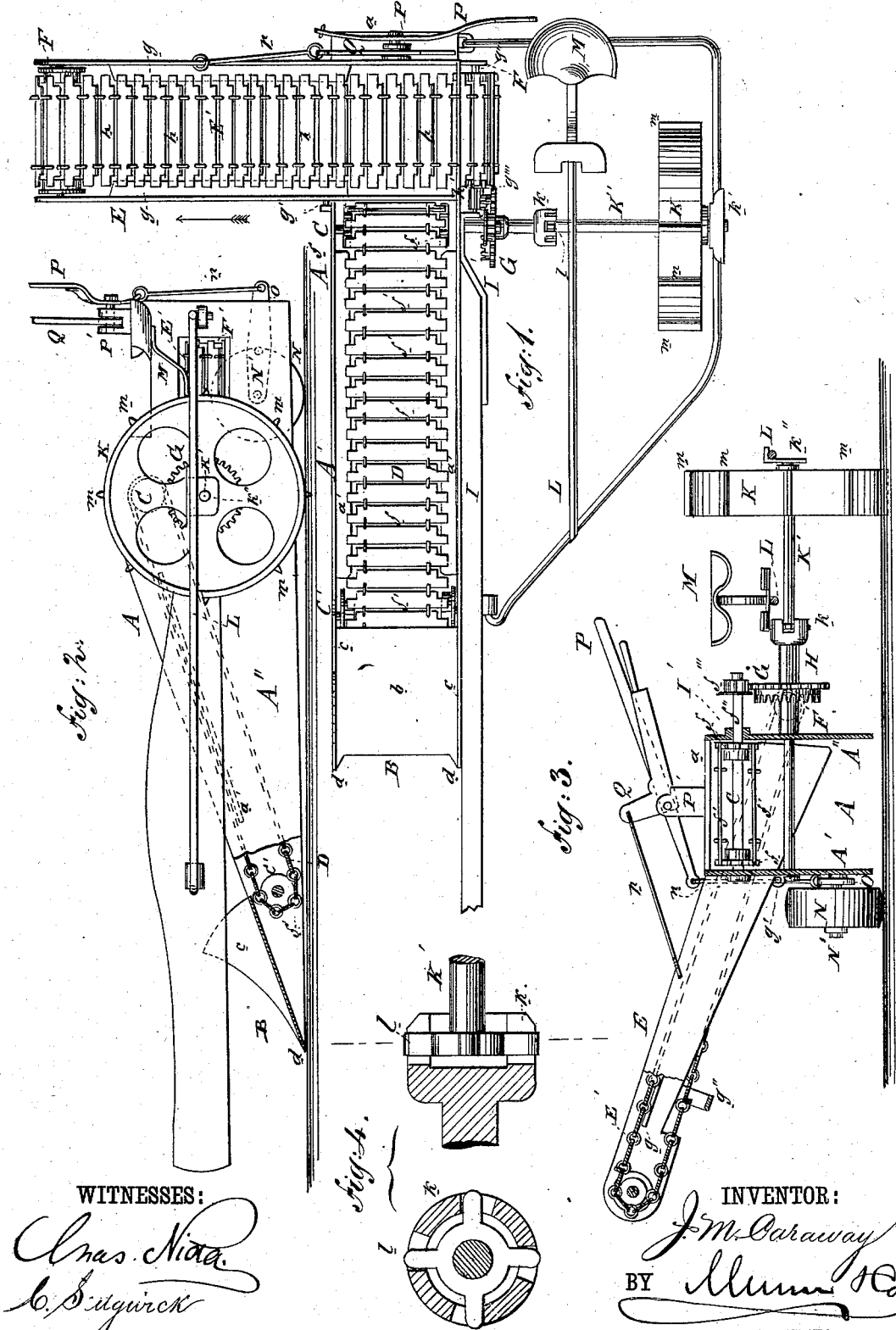

UNITED STATES PATENT OFFICE.

JAMES M. CARAWAY, OF BELOIT, KANSAS.

DIGGING AND GRADING MACHINE.

SPECIFICATION forming part of Letters Patent No. 238,346, dated March 1, 1881.

Application filed July 1, 1880. (No model.)

*To all whom it may concern:*

Be it known that I, JAMES M. CARAWAY, of Beloit, in the county of Mitchell and State of Kansas, have invented a new and Improved Digging and Grading Machine, of which the following is a specification.

The object of this invention is to provide a simple and effective machine for grading roads, making ditches, digging potatoes, &c.

Figure 1 is a plan of the machine. Fig. 2 is a side elevation of the device with parts broken away to exhibit other parts. Fig. 3 is a front elevation of the same, partly in section. Fig. 4 represents an enlarged sectional elevation of the coupling device of the driving-wheel axle and main driving-shaft of the other mechanism.

Similar letters of reference indicate corresponding parts.

In the drawings, A represents the frame of the machine, consisting of two elongated triangular side plates, A' A'', held together and parallel with each other by the brace $a$ at the rear of the frame, the plow-point B at the extreme forward end of the frame, and by other suitable devices. This plow-point B consists of a flat plate, $b$, fitting between the side plates, A' A'', and set on the same slope as the upper edges of said plates at an inclination of thirty degrees, or thereabout, and of the upward projections, $c$ $c$, of the side plates, A' A'', that form side cutters on either side of the plate $b$, and of the points $d$ $d$ of said side plates, A' A'', that are extended forward on either side of plate $b$, and form the pointed entering-teeth of the said plow-point B. I do not always confine myself to this precise construction of the plow-point B, as it is obvious that it may be made in one casting and secured in place between or on the side plates, A' A''.

C C' are rollers, that are passed transversely through the frame A, from side to side thereof, to support the endless apron D; and the upper roller, C, has fixed upon it toothed wheels $f\,f$, whose teeth engage with the ends of the links $f'$ composing the endless apron D, and thereby cause said apron D to revolve, and in its revolutions said apron D is supported by the side flanges, $a'$ $a'$, of the side plates, A' A''. The shaft $f''$ of the upper roller, C, extends through the side A'' of the frame A, and has keyed upon it a pinion, $f''''$, that gears with the cog-wheel G of the driving-shaft H, so that when the device is in motion the said apron D is thereby revolved.

A rectangular opening is made in the frame A in the rear of the apron D, and a chute or frame, E, provided with interior apron-supporting side flanges $g$, shafts or rollers F F', and endless apron E', is pivoted therein, that it may move in a vertical plane on the rod $g'$, at right angles to the said frame A. Near their front ends the side plates of this chute or frame E are held together by the brace $g''$. The shaft F' of the frame E is provided with toothed wheels $g'''$, whose teeth engage with the ends of the links $h$ of the apron E', and thereby cause said apron E' to revolve in the direction of the arrow shown in Fig. 1 when the device is in motion. On the inner end of this shaft F' is fixed a pinion, $h'$, that gears into the lateral teeth of the cog-wheel G of the driving-shaft H. This driving-shaft H is passed transversely through the frame A, and is journaled therein, being also supported by passing through the brace I', which holds the plow-beam or tongue I of the device to the outside of the plate A'', as shown, the right-angled end of said brace I' serving also as a support or journal-box for the inner end of the shaft F'. The extreme outer end of this driving-shaft H is enlarged, cup shape, and crenated, as shown at $k$.

K is the driving-wheel of the device, provided with circumferential ribs $m$, for giving it a better hold on the ground; and K' is the axle of said wheel K, the outer end of which axle K' is journaled in the hanging box $k''$, which depends from the seat-frame L, while on the inner end of said axle K' is fixed a radially-armed collar, $l$, that is entered into the cup-shaped end of the driving-shaft H, and thereby makes connection between said wheel K and the other mechanism of the device. This somewhat flexible connection between the driving-wheel K and driving-shaft H is preferable to a rigid connection, as thereby the jolting and irregular movements of the said wheel K when in motion are prevented from being transmitted to the rest of the moving mechanism of the device. The seat-frame L consists of stout bars or rods secured to the side of the device and extending laterally